United States Patent
Nowakowski

(10) Patent No.: US 12,540,969 B2
(45) Date of Patent: Feb. 3, 2026

(54) DIAGNOSTIC SYSTEMS AND METHODS

(71) Applicant: The Boeing Company, Arlington, VA (US)

(72) Inventor: Mark Edward Nowakowski, Arlington, VA (US)

(73) Assignee: The Boeing Company, Arlington, VA (US)

(*) Notice: Subject to any disclaimer, the term of this patent is extended or adjusted under 35 U.S.C. 154(b) by 347 days.

(21) Appl. No.: 18/457,071

(22) Filed: Aug. 28, 2023

(65) Prior Publication Data

US 2025/0076373 A1    Mar. 6, 2025

(51) Int. Cl.
*G01R 31/308* (2006.01)
*G01R 31/28* (2006.01)

(52) U.S. Cl.
CPC ....... *G01R 31/308* (2013.01); *G01R 31/2843* (2013.01)

(58) Field of Classification Search
CPC ... G01R 31/28; G01R 31/308; G01R 31/2843
See application file for complete search history.

(56) References Cited

U.S. PATENT DOCUMENTS

| | | | | |
|---|---|---|---|---|
| 2016/0327485 A1* | 11/2016 | Kiss | .................. | G01N 21/9501 |
| 2019/0391079 A1* | 12/2019 | Kiss | .................. | G01N 21/9505 |
| 2020/0400723 A1* | 12/2020 | Wolfowicz | ............. | G01R 15/24 |

OTHER PUBLICATIONS

G. Wolfowicz, S. J. Whiteley, and D.D. Awschalom. Electrometry by optical charge conversion of defects in 4H-SiC. PNAS 115, 7879-7883 (2018.
G. Wolfowicz, C. P. Anderson, S. J. Whiteley, and D.D. Awschalom. Heterodyne detection of radio-frequency electric fields using point defects in silicon carbide. Appl. Phys. Lett. 115, 043105 (2019).
R. J. Schoelkoph. The radio-frequency single-electron transistor (RF-SET): A fast and ultrasensitive electrometer. Science 280, 1238-1242 (1998).
F. Dolde, et al. Nanoscale detection of a single fundamental charge in ambient conditions using the NV-center in diamond. Phys. Rev. Lett. 112, 097603 (2014).
J. Bylander, T. Duty, P. Delsing. Current measurements by real-time counting of single electronics. Nature 434, 361-364 (2005.

* cited by examiner

*Primary Examiner* — Eman A Alkafawi
*Assistant Examiner* — Courtney G McDonnough
(74) *Attorney, Agent, or Firm* — Harrity & Harrity, LLP

(57) ABSTRACT

A method of operating a diagnostic system includes applying electric fields to test sites within an active layer of a circuit and illuminating sensor sites within a sensor layer of the circuit. The sensor layer comprises crystallographic defects and the sensor sites are respectively aligned with the test sites. The method also includes determining intensities of photoluminescence detected from the crystallographic defects of the sensor sites. The intensities correspond to a frequency range of photoluminescence that is indicative of charge densities within the test sites. The method also includes generating output indicating the intensities at each of the sensor sites.

20 Claims, 4 Drawing Sheets

DETERMINING THE CHARGE DENSITIES BASED ON THE INTENSITIES, WHEREIN GENERATING THE OUTPUT COMPRISES GENERATING THE OUTPUT SUCH THAT THE OUTPUT INDICATES THE CHARGE DENSITIES
310

DETERMINING SECOND INTENSITIES OF PHOTOLUMINESCENCE DETECTED FROM THE CRYSTALLOGRAPHIC DEFECTS OF THE SENSOR SITES THAT ARE PRESENT AT A SECOND TIME
312

GENERATING A SECOND OUTPUT INDICATING THE SECOND INTENSITIES
314

DIAGNOSTIC SYSTEMS AND METHODS

FIELD

The present disclosure relates generally to diagnostic systems and methods, and more specifically to diagnostic systems and methods for detecting photoluminescence from a circuit that is indicative of charge densities within the circuit.

BACKGROUND

Market and industry forces continue to incentivize the production of smaller circuits for many technical applications. Production of many of these circuits is trending toward single electron transistors capable of detecting electric fields on sub-micron length scales and indicating the presence or absence of a single electrons to satisfy low level logic inputs. There is also an emerging need for such components to operate in extreme thermal environments (e.g., cryogenic environments).

Current techniques for monitoring such circuits are typically electronic in nature. Traditional charge sensors often require noise-sensitive readout processes and carefully designed wire routings that can occupy significant circuit board area that might be better used for other purposes. Electronic readout processes can require measurement currents that, upon scaling within a cryogenic environment, require significant portions of a system's thermal budget.

As such, a need exists for improved systems and methods for monitoring small circuits.

SUMMARY

One aspect of the disclosure is a method of operating a diagnostic system, the method comprising: applying electric fields to test sites within an active layer of a circuit; illuminating sensor sites within a sensor layer of the circuit, wherein the sensor layer comprises crystallographic defects and the sensor sites are respectively aligned with the test sites; determining intensities of photoluminescence detected from the crystallographic defects of the sensor sites, wherein the intensities correspond to a frequency range of photoluminescence that is indicative of charge densities within the test sites; and generating output indicating the intensities at each of the sensor sites.

Another aspect of the disclosure is non-transitory computer readable medium storing instructions that, when executed by a diagnostic system, cause the diagnostic system to perform functions comprising: applying electric fields to test sites within an active layer of a circuit; illuminating sensor sites within a sensor layer of the circuit, wherein the sensor layer comprises crystallographic defects and the sensor sites are respectively aligned with the test sites; determining intensities of photoluminescence detected from the crystallographic defects of the sensor sites, wherein the intensities correspond to a frequency range of photoluminescence that is indicative of charge densities within the test sites; and generating output indicating the intensities at each of the sensor sites.

Another aspect of the disclosure is a diagnostic system comprising: one or more processors; one or more power sources; one or more electrodes; one or more light sources; one or more photodetectors; a user interface; and a computer readable medium storing instructions that, when executed by the one or more processors, cause the diagnostic system to perform functions comprising: applying, via the one or more electrodes and the one or more power sources, electric fields to test sites within an active layer of a circuit; illuminating, via the one or more light sources, sensor sites within a sensor layer of the circuit, wherein the sensor layer comprises crystallographic defects and the sensor sites are respectively aligned with the test sites; determining, via the one or more photodetectors, intensities of photoluminescence detected from the crystallographic defects of the sensor sites, wherein the intensities correspond to a frequency range of photoluminescence that is indicative of charge densities within the test sites; and generating, via the user interface, output indicating the intensities at each of the sensor sites.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 4 is a block diagram of a method, according to an example.

FIG. 5 is a block diagram of a method, according to an example.

DETAILED DESCRIPTION

As noted above, a need exists for improved systems and methods for monitoring small circuits. Accordingly, this disclosure includes such systems and methods.

A method of operating a diagnostic system includes applying electric fields to test sites within an active layer of a circuit. For example, the diagnostic system applies DC or AC electric fields respectively to test sites within the active layer, such as single-electron transistors or terminals of such devices. The active layer usually contains an integrated circuit including many interconnected devices that serve a functional purpose. The diagnostic system also illuminates sensor sites within a sensor layer of the circuit using one or more lasers, for example. The illumination is typically done simultaneously with application of the electric fields. The sensor layer can be made of silicon carbide, silicon, diamond, or any semiconductor or other material that inherently or potentially includes crystallographic defects that are optically addressable. The sensor layer is generally laid upon or deposited on the active layer and primarily serves a diagnostic purpose. The illuminated sensor sites are respectively aligned in two dimensions with the test sites, such that the sensor sites are directly above the test sites, for example. That is, the one or more lasers are aligned to illuminate the sensor sites directly above or adjacent to the test sites of the active layer. The method also includes determining intensities of photoluminescence detected from the crystallographic defects of the sensor sites (e.g. photoluminescence induced by the illumination). The intensities correspond to a frequency range of photoluminescence that is indicative of charge densities within the test sites. For each sensor site, the intensity of the photoluminescence within a particular frequency range can be proportional to the charge density within the corresponding test site. The method also includes generating output (e.g., via a user interface) indicating the intensities at each of the sensor sites.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1:
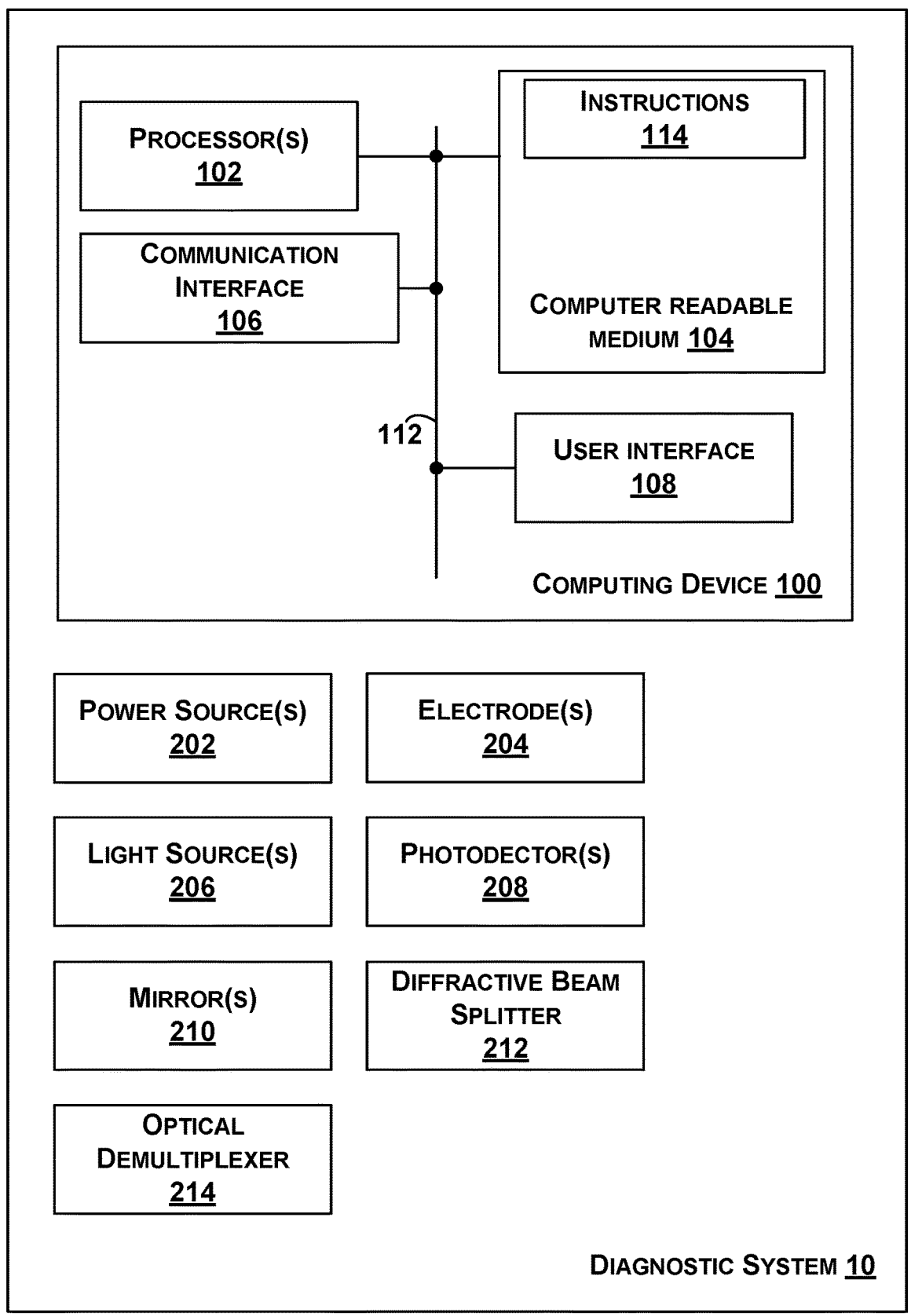
FIG. 1 is a block diagram of a diagnostic system, according to an example.

FIG. 1 is a block diagram of a diagnostic system 10. The diagnostic system 10 includes a computing device 100, one or more power sources 202, one or more electrodes 204, one or more light sources 206, one or more photodetectors 208, one or more mirrors 210, a diffractive beam splitter 212, and an optical demultiplexer 214.

The computing device 100 includes one or more processors 102, a non-transitory computer readable medium 104, a communication interface 106, and a user interface 108. Components of the computing device 100 are linked together by a system bus, network, or other connection mechanism 112.

The one or more processors 102 can be any type of processor(s), such as a microprocessor, a field programmable gate array, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can store instructions 114. The instructions 114 are executable by the one or more processors 102 to cause the computing device 100 to perform any of the functions or methods described herein.

The communication interface 106 can include hardware to enable communication within the computing device 100 and/or between the computing device 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the computing device 100 can use to control various components of the computing device 100 or external devices.

The user interface 108 can include any type of display component configured to display data. As one example, the user interface 108 can include a touchscreen display. As another example, the user interface 108 can include a flat-panel display, such as a liquid-crystal display (LCD) or a light-emitting diode (LED) display. The user interface 108 can include one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 can enable an operator to interact with a graphical user interface (GUI) provided by the computing device 100 (e.g., displayed by the user interface 108).

The power sources 202 can include any electrical power source configured to generate a controllable voltage and/or a controllable current. The power source 202 will typically have a low output impedance such that variations in the connected load do not greatly affect the voltage or current generated.

The one or more electrodes 204 are configured to distribute voltages or currents from the power sources 202 to many loads.

The one or more light sources 206 typically include one or more lasers, but other examples are possible.

The one or more photodetectors 208 can include metal-semiconductor-metal photodetectors, photodiodes, avalanche photodiodes, phototransistors, charge-coupled devices, complementary metal-oxide-semiconductor sensors, or photomultiplier tubes.

The one or more mirrors 210 include any device having a surface configured to reflect light via specular reflection.

The diffractive beam splitter 212 is configured to divide a single optical beam into an array of multiple beams.

The optical demultiplexer 214 is configured to provide an input optical beam from the one or more light sources 206 to one of many output ports. That is, the optical demultiplexer 214 receives a control signal that identifies one or more outputs of the optical demultiplexer 214, and the optical demultiplexer 214 provides the input optical beam to the outputs identified by the control signal.

Figure 2:
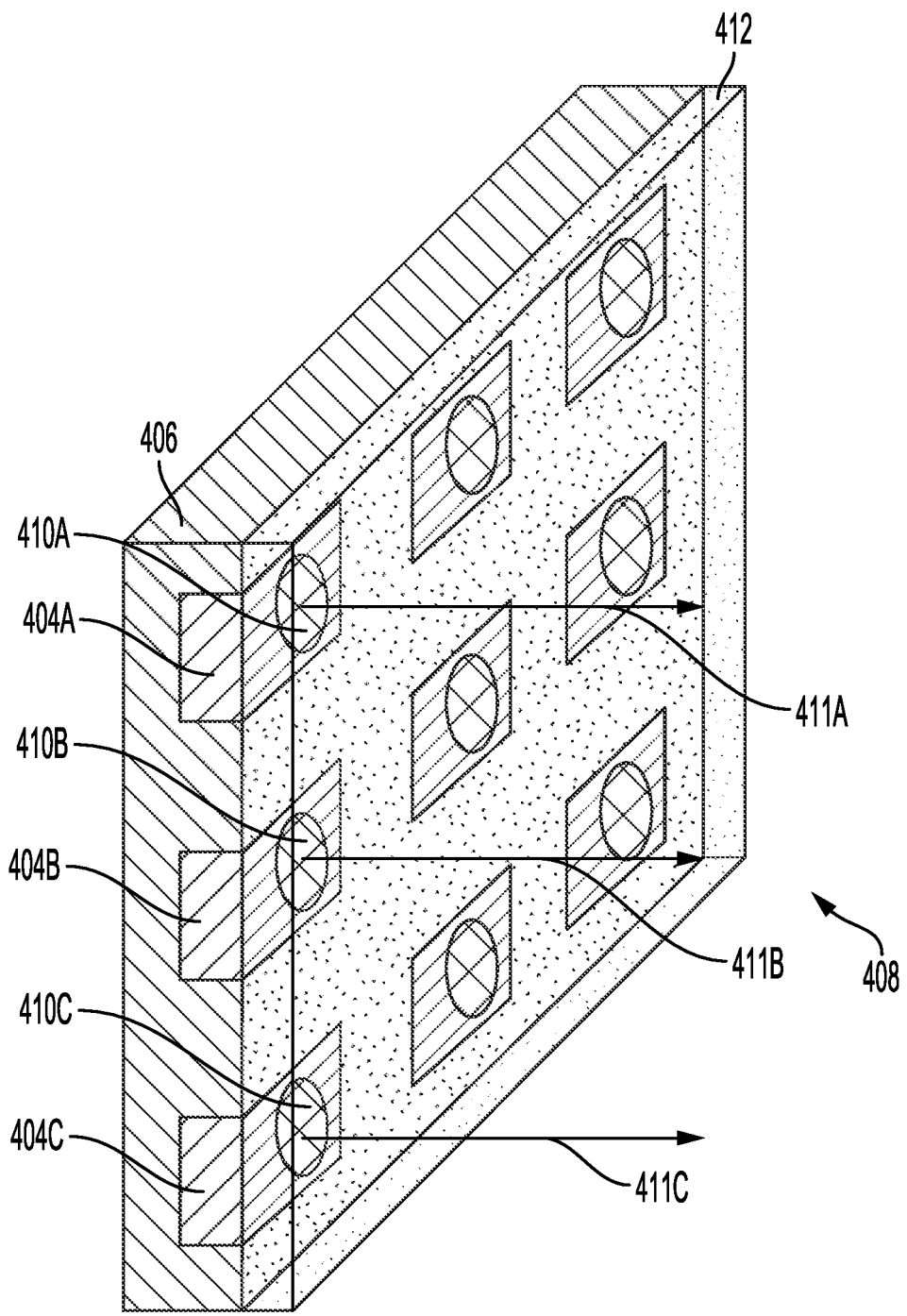
FIG. 2 is a schematic diagram of a circuit, according to an example.

FIG. 2 is a schematic diagram of a circuit 408. The circuit 408 includes an active layer 406 and a sensor layer 412. The active layer 406 contains one or more integrated circuits including many interconnected devices that serve functional purposes. For example, the active layer 406 can be formed of silicon and include dozens or hundreds of test sites such as the test site 404A, the test site 404B, and the test site 404C. The test sites 404 can be regions within the active layer 406 that each include one or more devices, such as a single-electron transistor, a coulomb blockade-based charge device, or an avalanche photodiode. Additionally or alternatively, the test sites 404 each include one or more terminals of such devices. Monitoring the charge densities present at such devices can be informative.

The sensor layer 412 can be made of silicon carbide, silicon, diamond, or any semiconductor or other material that inherently or potentially includes crystallographic defects that are optically addressable. The sensor layer 412 is generally laid upon or deposited on the active layer 406 and primarily serves a diagnostic purpose. Under certain conditions, the crystallographic defects within the sensor layer 412 can exhibit photoluminescence that indicates a nearby charge density (e.g., a charge density within the active layer 406).

The computing device 100 causes the electrodes 204 and the power sources 202 to apply electric fields (e.g., individually) to the test site 404A, the test site 404B, and the test site 404C. Typically, the electrodes 204 and the power sources 202 (e.g., simultaneously or sequentially) apply electric fields to all of the test sites 404 within the active layer 406. That is, the power sources 202 can generate a voltage or current waveform that is applied to each of the test sites 404. The electrodes 204 can be routed through the back of the active layer 406 (left side in FIG. 2) or sides of the active layer 406. In some examples, applying the electric fields to each of the test sites 404 perturbs the electronic energy bands within the active layer 406 and the sensor layer 412 such that the intensity of photoluminescence from the sensor layer 412 is enhanced for detectability. Additionally or alternatively, applying the electric fields causes photoluminescence to be induced more easily by illumination. Other effects of the electric fields are possible.

The computing device 100 also causes the light source(s) 206 (e.g., one or more lasers) to illuminate the sensor sites 410 within the sensor layer 412 of the circuit 408. For example, the light source(s) 206 illuminate each of the sensor sites 410, such as the sensor site 410A, the sensor site 410B, and the sensor site 410C. As shown in FIG. 2, circular spots represent illumination caused by the light source(s) 206, with light beam(s) travelling from right to left to impinge the sensor sites 410. As shown, the sensor sites 410 are respectively aligned from left to right with the test sites 404. For instance, the sensor site 410A is aligned with the test site 404A, the sensor site 410B is aligned with the test site 404B, and the sensor site 410C is aligned with the test site 404C. In many cases, the light source(s) 206 illuminate the sensor sites 410 simultaneously with the electrodes 204 and the power sources 202 applying the electric fields to the test sites 404.

In particular examples, the light source(s) 206 illuminating the sensor sites 410 involves the light source(s) 206 illuminating the sensor sites 410 with a first light having a first wavelength and thereafter the light source(s) 206 illuminating the sensor sites 410 with a second light having a second wavelength that is different from the first wavelength. This sequential process can enable the sensor sites 410 to exhibit photoluminescence more efficiently via illumination and to enhance optical readout. In many examples, the light source(s) 206 illuminate the sensor sites 410 simultaneously and/or synchronously. That is, the light source(s) 206 illuminate the sensor sites 410 with the same amplitude, oscillation frequency, and phase of light simultaneously.

The light source(s) 206 illuminating the sensor sites 410 can be accomplished in a number of other implementations. For example, a single light source 206 can be used to illuminate many sensor sites 410. One way is for the light source 206 to emit a beam that reflects from the mirror 210 such that the beam travels to the sensor site 410A. Then, the computing device 100 can steer the mirror 210 such that the beam is reflected to the sensor site 410B, and so on. In this example, detection of photoluminescence from each sensor site 410 is performed sequentially (e.g., not simultaneously).

In other examples, the diffractive beam splitter 212 is used to split the beam from the light source 206 and illuminate many sensor sites 410 simultaneously. In this example, detection of photoluminescence from each sensor site 410 is performed simultaneously as well.

In other examples, the optical demultiplexer 214 is used to digitally raster the beam from the light source 206 and sequentially illuminate many sensor sites 410. In this example, detection of photoluminescence from each sensor site 410 is performed sequentially and not simultaneously.

The computing device 100 also determines, via the one or more photodetectors 208, intensities of photoluminescence 411 detected from the crystallographic defects of the sensor sites 410. Generally, the computing device 100 determines the intensities of the photoluminescence 411 that are detected while the electric fields are applied to the test sites 404 and while the sensor sites 410 are being illuminated. For example, the computing device 100 determines an intensity of a photoluminescence 411A detected from the sensor site 410A, an intensity of a photoluminescence 411B detected from the sensor site 410B, and an intensity of a photoluminescence 411C detected from the sensor site 410C. More particularly, the computing device 100 determines intensities of the photoluminescence 411 that correspond to a frequency range that is known to be indicative of charge densities within the corresponding test sites 404. For example, the frequency range can include one or more portions of the ultraviolet spectrum, one or more portions of the visible spectrum, and/or one or more portions of the infrared spectrum. For example, the intensity of the photoluminescence 411A detected within the frequency range of interest from the test site 410A can be proportional to a charge density present within the test site 404A.

The computing device 100 also generates output (e.g., images or text) indicating the intensities of the photoluminescence 411 via the user interface 108. For example, the user interface 108 generates output that indicates an intensity of the photoluminescence 411A, an intensity of the photoluminescence 411B, and an intensity of the photoluminescence 411C. In some examples, the computing device 100 can use a known correlation between the intensities of the photoluminescence 411, the electric fields applied to the test sites 404, and charge densities within the test sites 404, to determine charge densities at each of the test sites 404 and generate output that indicates the charge densities at each of the test sites 404.

In some examples, the diagnostic system 10 can be used to monitor the intensities of the photoluminescence 411 and/or the charge densities within the test sites 404 over time and thus monitor the behavior of the devices within the active layer 406 over time. As such, the computing device 100 can determine the intensities of the photoluminescence 411 and/or the charge densities at the test sites 404 at a first time and generate output accordingly. After some time passes (e.g., 1 ms), the computing device 100, while the test sites 404 are being provided electric fields and while the sensor sites 410 are being illuminated, can determine the intensities of the photoluminescence 411 and/or the charge densities at the test sites 404 and generate new output accordingly. In this example, the computing device 100 generates the output as a text file that can be reviewed by a user after the data is fully collected.

Figure 3:
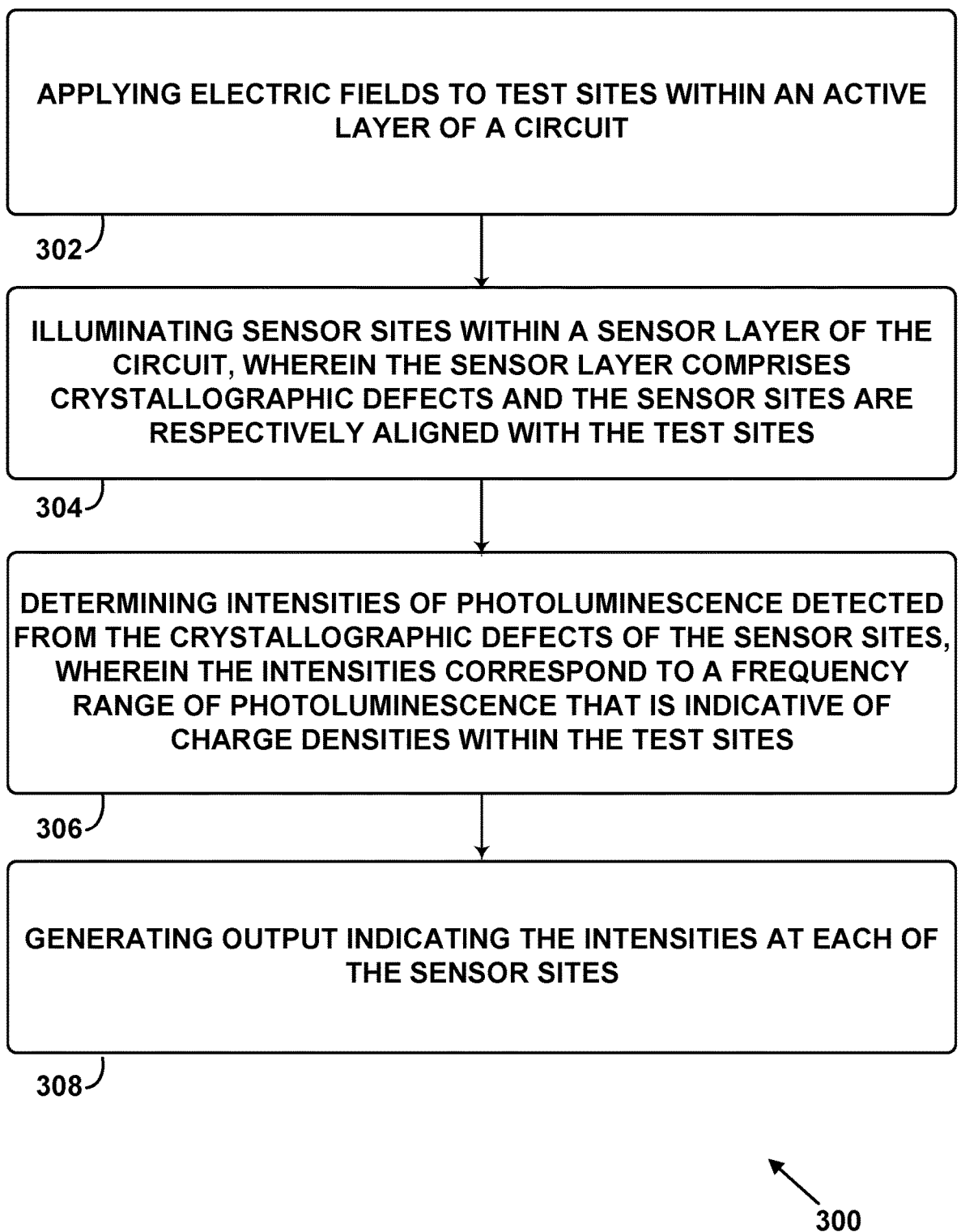
FIG. 3 is a block diagram of a method, according to an example.

FIGS. 3-5 are block diagrams of a method 300, a method 325, and a method 350, which in some examples are performed by the computing device 100 and/or the diagnostic system 10. As shown in FIGS. 3-5, the method 300, the method 325, and the method 350 include one or more operations, functions, or actions as illustrated by blocks 302, 304, 306, 308, 310, 312, and 314. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes the diagnostic system 10 applying electric fields to the test sites 404 within the active layer 406 of the circuit 408. The functionality of block 302 is discussed above with reference to FIG. 2.

At block 304, the method 300 includes the diagnostic system 10 illuminating the sensor sites 410 within the sensor layer 412 of the circuit 408. The sensor layer 412 includes crystallographic defects and the sensor sites 410 are respectively aligned with the test sites 404. The functionality of block 304 is discussed above with reference to FIG. 2.

At block 306, the method 300 includes the diagnostic system 10 determining the intensities of the photoluminescence 411 detected from the crystallographic defects of the sensor sites 410. The detected intensities correspond to a frequency range of photoluminescence that is indicative of charge densities within the test sites 404. The functionality of block 306 is discussed above with reference to FIG. 2.

At block 308, the method 300 includes the diagnostic system 10 generating output indicating the intensities at each of the sensor sites 410. The functionality of block 308 is discussed above with reference to FIG. 2.

At block 310, the method 325 includes the diagnostic system 10 determining the charge densities at the test sites 404 based on the intensities of the photoluminescence 411. Within this context, the diagnostic system 10 generates the output such that the output indicates the charge densities at each of the test sites 404. The functionality of block 310 is discussed above with reference to FIG. 2.

At block 312, the method 350 includes the diagnostic system 10 determining intensities of photoluminescence detected from the crystallographic defects of the sensor sites 410 that are present at a subsequent time. The functionality of block 312 is discussed above with reference to FIG. 2.

At block 314, the method 350 includes the diagnostic system 10 generating an output indicating the intensities of photoluminescence detected from the crystallographic defects of the sensor sites 410 that are present at a subsequent time. The functionality of block 314 is discussed above with reference to FIG. 2.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method of operating a diagnostic system, the method comprising:
   applying electric fields to test sites within an active layer of a circuit;
   illuminating sensor sites within a sensor layer of the circuit, wherein the sensor layer comprises crystallographic defects and the sensor sites are respectively aligned with the test sites;
   determining intensities of photoluminescence detected from the crystallographic defects of the sensor sites, wherein the intensities correspond to a frequency range of photoluminescence that is indicative of charge densities within the test sites; and
   generating output indicating the intensities at each of the sensor sites.

2. The method of claim 1, wherein the test sites comprise a single electron transistor, a coulomb blockade based charge device, or an avalanche photodiode.

3. The method of claim 1, wherein the sensor layer comprises a semiconductor.

4. The method of claim 1, wherein the sensor layer comprises silicon carbide, silicon, or diamond.

5. The method of claim 1, wherein applying the electric fields comprises applying the electric fields to each of the test sites simultaneously.

6. The method of claim 5, wherein illuminating the sensor sites comprises illuminating each of the sensor sites simultaneously with applying the electric fields.

7. The method of claim 1, wherein illuminating the sensor sites comprises:
   illuminating the sensor sites with a first light having a first wavelength; and
   thereafter illuminating the sensor sites with a second light having a second wavelength that is different from the first wavelength.

8. The method of claim 1, wherein illuminating the sensor sites comprises illuminating each of the sensor sites simultaneously.

9. The method of claim 1, wherein illuminating the sensor sites comprises illuminating the sensor sites using a laser.

10. The method of claim 9, wherein the sensor sites comprise a first sensor site and a second sensor site,
    wherein illuminating the sensor sites comprises:
       illuminating the first sensor site using the laser and a mirror; and
       steering the mirror such that the laser illuminates the second sensor site.

11. The method of claim 9, wherein illuminating the sensor sites comprises illuminating the sensor sites using the laser and a diffractive beam splitter.

12. The method of claim 9, wherein illuminating the sensor sites comprises illuminating the sensor sites using the laser and an optical demultiplexer.

13. The method of claim 1, further comprising determining the charge densities based on the intensities, wherein generating the output comprises generating the output such that the output indicates the charge densities.

14. The method of claim 13, wherein determining the charge densities comprises determining the charge densities that are present while applying the electric fields and while illuminating the sensor sites.

15. The method of claim 13, wherein determining the charge densities comprises determining the charge densities based on the electric fields and the intensities.

16. The method of claim 1, wherein generating the output comprises generating an image that indicates the charge densities or the intensities.

17. The method of claim 1,
    wherein determining the intensities comprises determining the intensities that are detected at a first time, wherein generating the output comprises generating the output that such that the output indicates the intensities that are detected at the first time, the method further comprising:
determining second intensities of photoluminescence detected from the crystallographic defects of the sensor sites that are present at a second time; and
generating a second output indicating the second intensities.

18. A non-transitory computer readable medium storing instructions that, when executed by a diagnostic system, cause the diagnostic system to perform functions comprising:
applying electric fields to test sites within an active layer of a circuit;
illuminating sensor sites within a sensor layer of the circuit, wherein the sensor layer comprises crystallographic defects and the sensor sites are respectively aligned with the test sites;
determining intensities of photoluminescence detected from the crystallographic defects of the sensor sites, wherein the intensities correspond to a frequency range of photoluminescence that is indicative of charge densities within the test sites; and
generating output indicating the intensities at each of the sensor sites.

19. A diagnostic system comprising:
one or more processors;
one or more power sources;
one or more electrodes;
one or more light sources;
one or more photodetectors;
a user interface; and
a computer readable medium storing instructions that, when executed by the one or more processors, cause the diagnostic system to perform functions comprising:
applying, via the one or more electrodes and the one or more power sources, electric fields to test sites within an active layer of a circuit;
illuminating, via the one or more light sources, sensor sites within a sensor layer of the circuit, wherein the sensor layer comprises crystallographic defects and the sensor sites are respectively aligned with the test sites;
determining, via the one or more photodetectors, intensities of photoluminescence detected from the crystallographic defects of the sensor sites, wherein the intensities correspond to a frequency range of photoluminescence that is indicative of charge densities within the test sites; and
generating, via the user interface, output indicating the intensities at each of the sensor sites.

20. The diagnostic circuit of claim 19, the functions further comprising determining the charge densities based on the intensities, wherein generating the output comprises generating the output such that the output indicates the charge densities.

* * * * *